United States Patent
Baddaria et al.

[11] Patent Number: 6,093,123
[45] Date of Patent: Jul. 25, 2000

[54] INTEGRATED CHAIN DRIVE TENSIONER AND SPROCKET ASSEMBLY

[75] Inventors: Giuseppe Baddaria, Padervo D'Adda; Enrico Zeccara, Arcore; Michelino Bestetti, Bruzherio, all of Italy

[73] Assignee: Morse Tec Europe S.p.A., Italy

[21] Appl. No.: 09/273,952

[22] Filed: Mar. 22, 1999

[30] Foreign Application Priority Data

Mar. 31, 1998 [EP] European Pat. Off. .............. 98830198

[51] Int. Cl.[7] ...................................................... F16H 7/18
[52] U.S. Cl. ........................ 474/110; 474/111; 474/137; 474/148
[58] Field of Search ................................... 474/101, 110, 474/111, 136, 137, 140, 148

[56] References Cited

U.S. PATENT DOCUMENTS

| | | | |
|---|---|---|---|
| 4,850,314 | 7/1989 | Villa | 474/140 |
| 4,869,708 | 9/1989 | Hoffmann et al. | 474/140 |
| 4,879,977 | 11/1989 | Restelli | 474/140 |
| 5,055,088 | 10/1991 | Cradduck et al. | 474/111 |
| 5,180,340 | 1/1993 | Vahabzadeh et al. | 474/140 |
| 5,286,234 | 2/1994 | Young | 474/111 |
| 5,346,429 | 9/1994 | Farley | 460/16 |
| 5,425,680 | 6/1995 | Young | 474/111 |

FOREIGN PATENT DOCUMENTS

| | | | |
|---|---|---|---|
| 0 280 365 A2 | 8/1988 | European Pat. Off. | F16H 7/18 |
| 0 297 263 A1 | 1/1989 | European Pat. Off. | F16H 7/18 |
| 196 22 122 A1 | 12/1997 | Germany | F16H 7/18 |
| 2 092 705 | 8/1982 | United Kingdom | F16H 7/18 |

OTHER PUBLICATIONS

European Search Report for Application No. EP 98 83 0198 dated Aug. 28, 1998.

*Primary Examiner*—Dirk Wright
*Attorney, Agent, or Firm*—Sidley & Austin; Greg Dziegielewski

[57] ABSTRACT

An integrated chain drive, sprocket, and tensioning assembly includes sprockets, a drive chain, and a guiding and supporting structure for the sprockets. This structure includes a fixed shoe that is integral with the body of a fluid operated tensioning device, and a movable element with a tensioning shoe that is adjustable in position. The assembly can be fixed to a base or fixed structure and forms a single pre-assembled unit for transportation and mounting to an engine body.

11 Claims, 4 Drawing Sheets

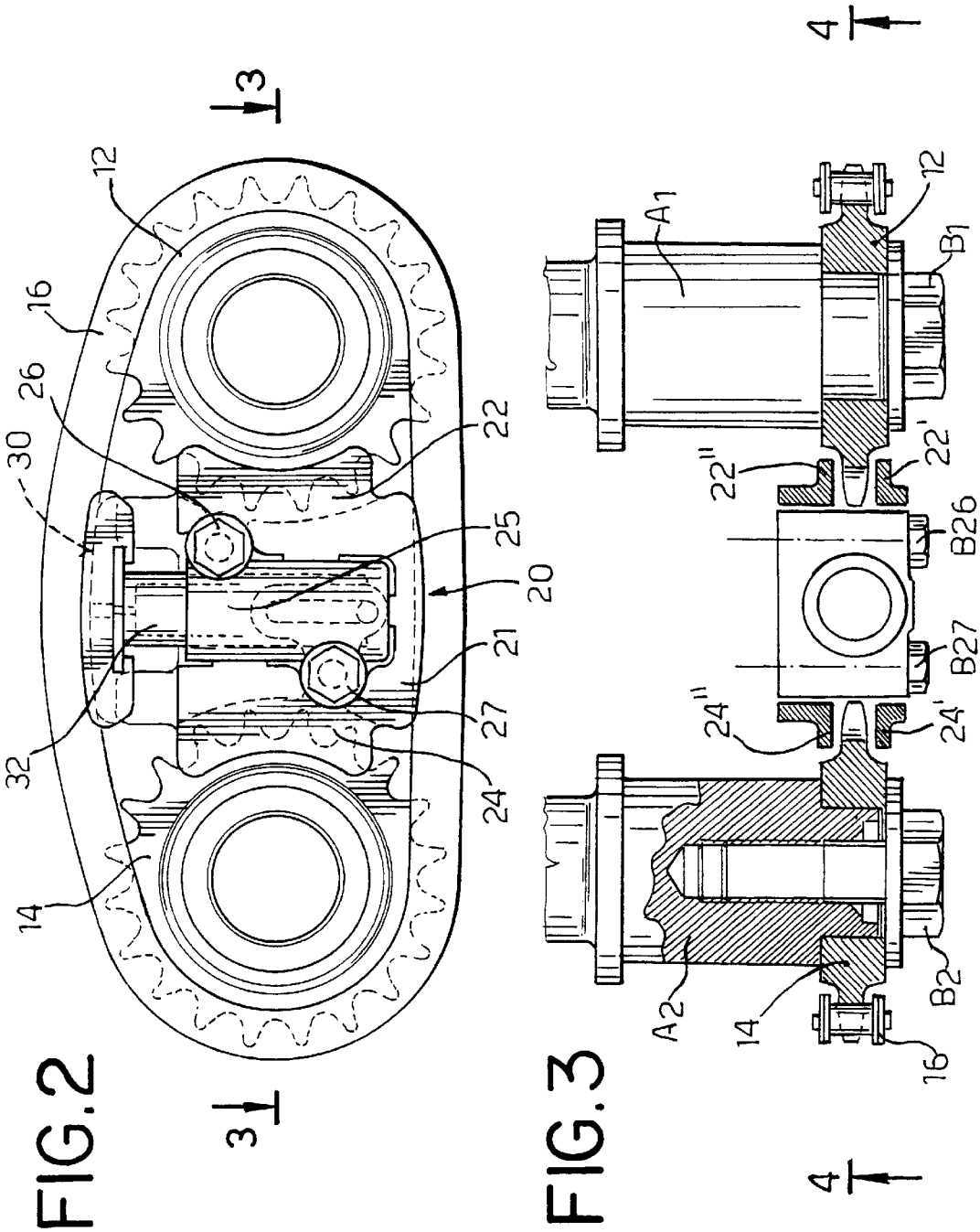

INTEGRATED CHAIN DRIVE TENSIONER AND SPROCKET ASSEMBLY

BACKGROUND OF THE INVENTION

This invention relates to timing systems for vehicle engines. The invention has particular application in systems that include two camshafts. The dual camshafts can both be rotated by connection to a single chain driven by the engine. Often, one of the camshafts is driven directly by the engine and the second camshaft is driven by an additional camshaft-to-camshaft ("cam-to-cam") chain drive. This drive generally comprises a pair of sprockets mounted on the driving shaft and driven shaft; a drive chain engaging both sprockets, and an intermediate tensioning device.

A tensioning device, such as a hydraulic tensioner, is used as a control device for the timing system. As a chain transmits power from a driving sprocket to a driven sprocket, one portion or strand of the chain between the sprockets will be tight while the other portion of the chain will be slack. In order to impart and maintain a certain degree of tension in the slack portion of the chain, a hydraulic tensioner provides a piston that presses against a tensioner arm or other chain guiding mechanism.

Prevention of excess slack in the chain is particularly important in the case of a chain driven camshaft in an internal combustion engine in that a chain without sufficient tension can skip a tooth or otherwise throw off the camshaft timing, possibly causing damage or rendering the engine inoperative. However, in the harsh environment of an internal combustion engine, various factors can cause fluctuations in the chain tension.

For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tension. Reverse rotation of an engine, occurring for example in stopping or in failed attempts at starting, can also cause fluctuations in chain tension. For these reasons, a mechanism such as a hydraulic tensioner is desired to ensure the necessary tension on the slack side of the chain.

Hydraulic tensioners are a common method of maintaining proper chain tension. In general, these devices employ a tensioner arm or lever arm that pushes against the chain on the slack side of the chain. This lever arm must push toward the chain, tightening the chain when the chain is slack, and must provide resistive force when the chain tightens.

Typically, a hydraulic tensioner includes a piston in the form of a hollow cylinder. The piston slides within a bore in the housing and is biased outward from the housing in the direction of the tensioner arm and chain by a piston spring. The interior of the piston forms a high pressure fluid chamber with the bore or opening in the housing. The high pressure chamber is connected through a one way check valve to a low pressure chamber or reservoir, which provides or is connected to an exterior source of hydraulic fluid.

Upon start-up, the force of the spring on the piston causes the piston to move further outward as the chain begins to move. Outward movement of the piston creates a low pressure condition in the high pressure fluid chamber, or pressure differential across the inlet check valve. Accordingly, the inlet check valve opens and permits the flow of fluid from the reservoir, or low pressure chamber, into the high pressure chamber. When the high pressure chamber is sufficiently filled with fluid, the force on the chain that moves the piston inward will be balanced by the outward force from the spring and the resistance force of the fluid in the chamber. The force of the chain against the fluid in the chamber also causes the check valve to close, which prevents further addition of fluid to the chamber.

In the typical tensioner and chain system, the various elements are separately assembled and then must be combined in the finished system on the engine. The assembly of these elements each separate from the other and separate positioning and mounting of each element results in the possibility of errors, a relatively long assembling time and possible differences in assembling, and therefore in performance, between one engine and another. The present invention is directed to an integrated assembly that overcomes these disadvantages.

SUMMARY OF THE INVENTION

The present invention is directed to an integrated assembly of a first sprocket and a second sprocket, and a transmission chain engaging with the sprockets. An intermediate structure between the sprockets includes a guide shoe fixed to the structure that has a guiding and a supporting portion for each sprocket or wheel. The system also includes a cylinder-shaped part for a movable tensioning device and a movable tensioning shoe with its piston being adjustable in position.

In one embodiment, the integrated assembly includes the chain, sprockets and hydraulic tensioner, which can all be assembled and mounted to the engine body as a unit. The body or cylinder for the tensioner forms one element of the intermediate structure and is made of metallic material. The guiding and supporting portions for the sprockets and the fixed guide shoe form an element made of plastic and both elements are made integral or restrained with each other. In another embodiment, both the guide-supports for the sprockets with the fixed shoe and the cylindrical body and fixing portion are made of plastic, possibly metal-coated, in a single block.

The integrated assembly can be produced, transported and assembled as a whole, with considerable advantages as regards assembling operations, assembly tolerances, and consistency of the characteristics of equipment incorporating such assemblies.

Examples of embodiments will be described below with reference to the attached drawings in which an object of the invention is to facilitate the operations for assembling a chain drive of the cam-to-cam drive type.

Another object of the invention is to reduce assembling times for the system that includes the chain drive and tensioner.

Yet another object of the invention is to allow mass production and assembling of such drives with repetitive characteristics in the drives produced.

BRIEF DESCRIPTION OF THE DRAWINGS

FIG. 2 is a plan view of the assembly in FIG. 1.

FIG. 3 is a sectional view taken along a line indicated by 3—3 in FIG. 2.

DETAILED DESCRIPTION OF THE PREFERRED EMBODIMENTS

Figure 1:
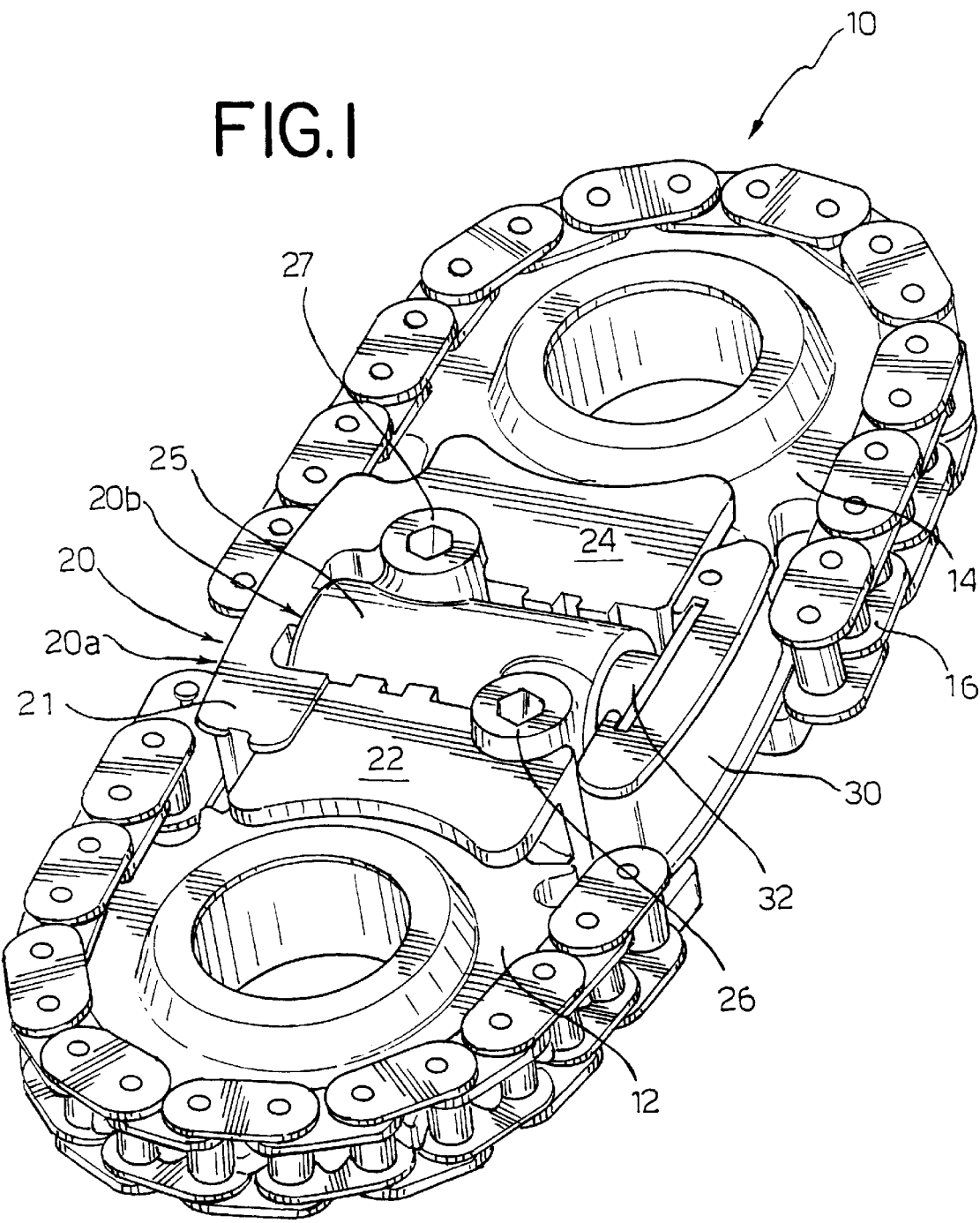
FIG. 1 is a perspective view of an integrated cam-to-cam drive assembly and tensioner according to the invention.

Turning now to the drawings, with reference to the figures, an integrated assembly according to the invention is indicated as a whole by reference numeral 10. The assembly comprises a first sprocket 12, a second sprocket 14, and a transmission or drive chain 16 engaging the sprockets. A supporting and guiding structure 20 is placed between the sprocket wheels, and a movable tensioning shoe 30. The toothed sprockets 12, 14 and the chain 16 are of a conventional type and therefore will not be described in greater detail. The supporting and guiding structure 20 includes a fixed guide shoe portion 21. A guiding and supporting portion 22 is included for the sprocket 12. A guiding and supporting portion 24 is included for the opposite sprocket 14. The structure 20 also comprises a body or cylinder 25 for the adjustable tensioning device. Eyelets 26, 27 are included for fixing the assembly to the engine block. The parts 21, 22, 24 of the structure are made as a single plastic element 20a. The body 25 with the eyelets 26 and 27 is made as a single metal element 20b, which is made integral with, preferably restrained to element 20a in any suitable manner. A structure 20 that comprises a body 25 made totally or partially of plastic, in one piece with the element 20a made of plastic, is also possible and within the scope of the present invention.

The supporting and guiding parts 22, 24 for the sprockets each comprise a longitudinal U-shaped channel or groove as shown in FIG. 3. The grooves include opposite lugs or tabs 22', 22" for the part 22 and opposite lugs or tabs 24', 24" for the part 24. The distance between the facing surfaces of the lugs or tabs 24', 24' and of the lugs 22', 22" is such as to allow rotation of the respective wheel 14 or 12.

In FIG. 3 the assembly is shown mounted with the sprocket 12 mounted on a shaft A1 and fixed thereto by the bolt B1. The sprocket 14 is fixed to a shaft A2 by means of the bolt B2. Bolts B26 and B27 are included for fixing the structure to an underlying fixed casing (not shown). Each bolt B26 or B27 extends through the respective eyelet 26 and 27.

Figure 4:
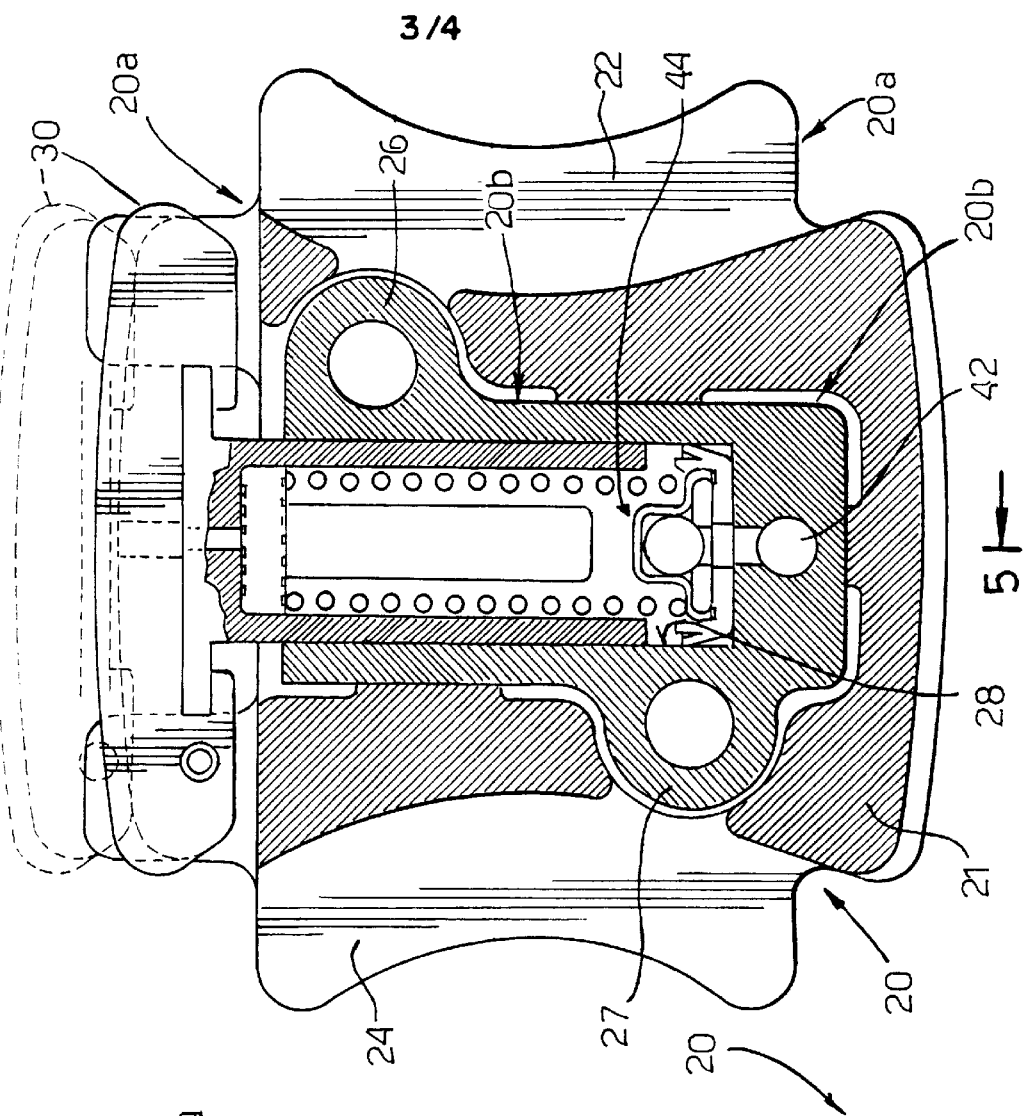
FIG. 4 is an enlarged sectional view of a support and guide structure of the assembly taken along a line indicated by 4—4 in FIG. 3.

FIG. 4 shows an internal fluid chamber 28 defined in the body. The chamber holds the piston which is slidable and adjustable in position axially. A tensioning shoe 30 is mounted on the piston. The piston and tensioning shoe 30 are controlled in a usual manner by fluid fed through a conduit 42 and a check valve 44.

Figure 5:
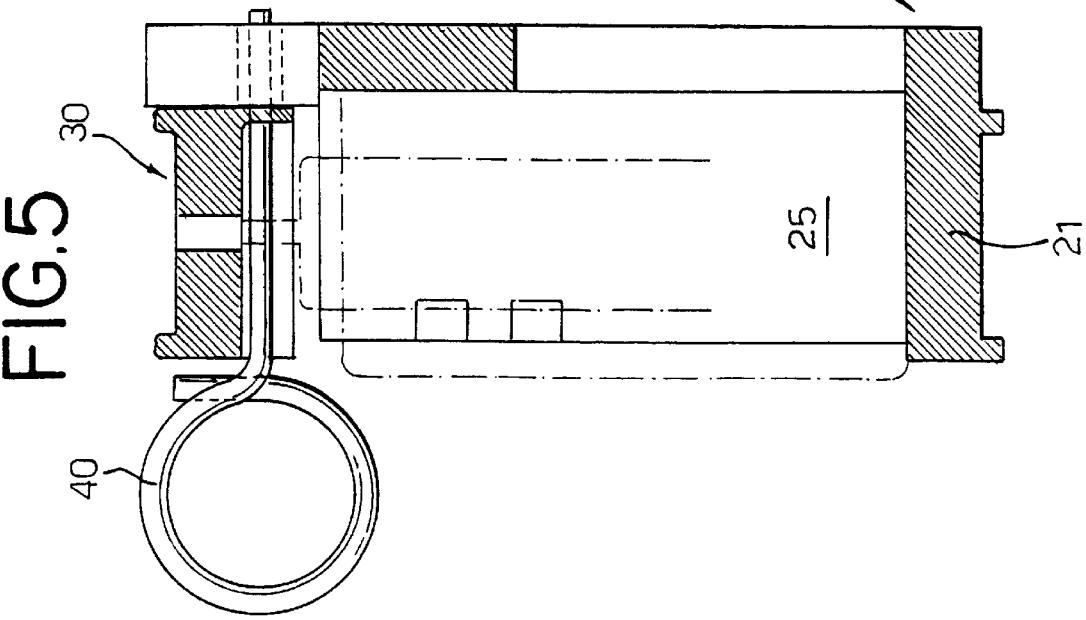
FIG. 5 is a sectional view taken along a line marked 5—5 in FIG. 4.
Figure 6:
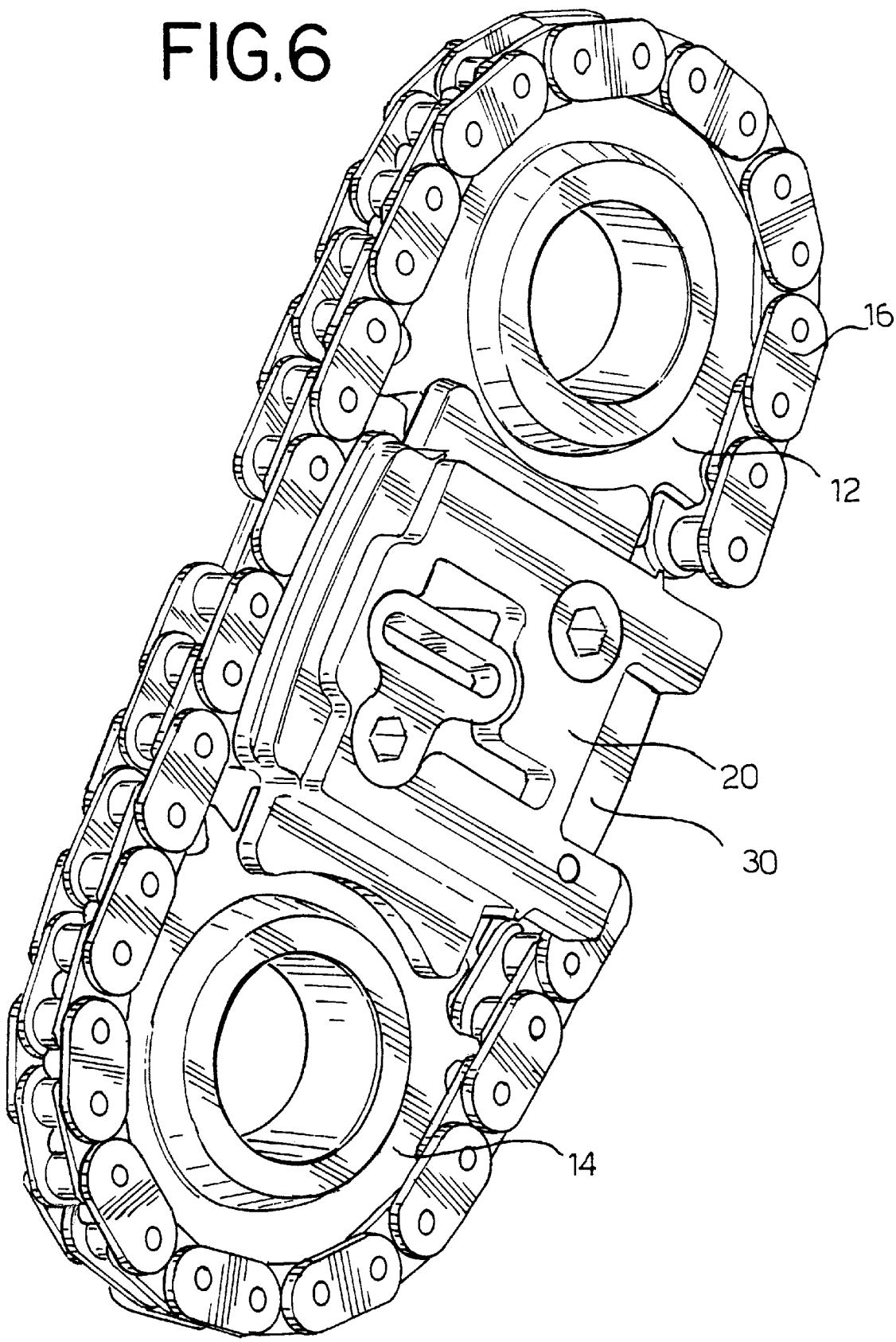
FIG. 6 is a perspective view from below the assembly of the invention.

FIG. 5 also shows a locking pin 40, which locks the tensioning shoe 30 in a retracted position for transportation. Fixed guide shoe 21 is opposite the tensioning shoe 30. FIG. 6 shows the drive assembly from behind and below. The chain is shown as disconnected for illustration purposes. Structure 20 carries the tensioning shoe 30. Drive chain 16 engages the first and second sprocket wheels 12, 14.

It should be noted that although the description has been made with reference to an exemplary embodiment consisting of a roller chain drive, it can equally be applied to chain drives of a different type. It should also be noted that although the invention has been described with particular reference to cam to cam drives for engines, other types of drives in other fields are equally well considered possible.

Those skilled in the art to which the invention pertains may make other modifications and embodiments employing the principles of this invention without departing from its spirit or essential characteristics, particularly upon considering the foregoing teachings. The described embodiments are to be considered in all respects as only illustrative and not restrictive.

What is claimed is:

1. An integrated chain drive, sprocket and tensioning assembly comprising:
    a first drive sprocket and a second drive sprocket,
    an elongated flexible drive chain extending between said first and second sprockets, to transmit drive from said first sprocket to said second sprocket and engaging with both;
    an intermediate structure, including a guide shoe located between said sprockets,
    a hydraulic tensioner with a tensioner shoe adjustable in position, and
    said intermediate structure including sprocket engaging and housing parts, said intermediate structure, sprockets, tensioner and shoes being made as a single integrated assembly.

2. An assembly according to claim 1, wherein said sprocket engaging and housing parts each comprise an arc shaped groove defined by lugs, said lugs being spaced apart to accommodate a sprocket portion.

3. An assembly according to claim 1, wherein said intermediate structure includes said hydraulic tensioner having a body with a movable piston housed therein, said piston fastened to said tensioning shoe.

4. An assembly according to claim 3, wherein said intermediate structure further comprises:
    a first element including said sprocket engaging and housing parts and said fixed shoe, and
    a second element including said body, said piston and said tensioner shoe.

5. An assembly according to claim 4, wherein said first element is made of plastic and said second element further includes eyelets for fastening said intermediate structure to an associated engine block, said second element being made of metal.

6. An assembly according to claim 3, wherein said first and second elements are made as a single piece at least partially of plastic.

7. An assembly according to claim 1, wherein said elongated flexible drive chain is a roller chain.

8. A supporting and guiding structure for a drive assembly for transmitting drive by means of an elongated chain between two sprockets, comprising a fixed guide shoe part for the chain, a tensioning shoe part that can be extended with respect to said fixed guide shoe part, said structure further comprising opposite supporting and guiding parts for said sprockets.

9. A structure according to claim 8, wherein said opposite supporting and guiding parts comprise channels between lugs.

10. A structure according to claim 8, comprising an element that forms said fixed shoe and said supporting and guiding parts for the sprockets and an element that forms a housing body for the tensioning shoe, said elements being made integral with each other.

11. A structure according to claim 10, wherein said elements are a single body forming said fixed guide shoe, said supporting and guiding parts for the sprockets and said body for the tensioning shoe.

* * * * *